United States Patent
Bohling et al.

(10) Patent No.: US 9,469,758 B2
(45) Date of Patent: Oct. 18, 2016

(54) BIMODAL ADSORBING LATEX

(71) Applicants: Dow Global Technologies, LLC, Midland, MI (US); Rohm and Haas Company, Philadelphia, PA (US)

(72) Inventors: James C. Bohling, Lansdale, PA (US); Beth Cooper, Doylestown, PA (US); Melinda H. Keefe, Willow Grove, PA (US); Margo Schaefer, Chalfont, PA (US)

(73) Assignees: Rohn and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 272 days.

(21) Appl. No.: 14/321,911

(22) Filed: Jul. 2, 2014

(65) Prior Publication Data
US 2015/0011695 A1    Jan. 8, 2015

Related U.S. Application Data

(60) Provisional application No. 61/843,532, filed on Jul. 8, 2013.

(51) Int. Cl.
| | |
|---|---|
| *C08F 265/06* | (2006.01) |
| *C08L 33/08* | (2006.01) |
| *C09D 7/12* | (2006.01) |
| *C09D 151/00* | (2006.01) |

(52) U.S. Cl.
CPC ............. *C08L 33/08* (2013.01); *C08F 265/06* (2013.01); *C09D 7/125* (2013.01); *C09D 7/1275* (2013.01); *C09D 151/003* (2013.01); *C08L 2207/53* (2013.01)

(58) Field of Classification Search
CPC ............. C09D 7/1266; C09D 7/1275; C08L 2207/53; C08L 2205/025
See application file for complete search history.

(56) References Cited

U.S. PATENT DOCUMENTS

| | | | |
|---|---|---|---|
| 6,080,802 A | 6/2000 | Emmons et al. | |
| 6,818,697 B2 | 11/2004 | Zhang et al. | |
| 7,179,531 B2 | 2/2007 | Brown et al. | |
| 8,034,869 B2 * | 10/2011 | Bobsein ................ | C09D 7/002 524/27 |

FOREIGN PATENT DOCUMENTS

| | | |
|---|---|---|
| EP | 1746137 A1 | 1/2007 |
| EP | 2281856 A1 | 2/2011 |

* cited by examiner

*Primary Examiner* — Mark Kaucher
(74) *Attorney, Agent, or Firm* — Reid S. Willis

(57) ABSTRACT

The present invention relates to a composition comprising a stable aqueous dispersion of large acrylic based polymer particles and small acrylic based polymer particles wherein the large polymer particles comprise structural units of a phosphorus acid monomer or a salt thereof; and wherein the small polymer particles comprise a substantial absence of structural units of any phosphorus acid monomer and salts thereof. The bimodal dispersion of the present invention provides a way of making a high solids adsorbing latex with high hiding efficiency.

13 Claims, No Drawings

BIMODAL ADSORBING LATEX

BACKGROUND OF THE INVENTION

The present invention relates to a latex with two distinct particle size ranges and is useful as a binder in coatings formulations.

The ability to prepare polymer dispersions (latexes) having high solids content (>55 weight percent) is desirable because higher relative amounts of water increase costs and storage requirements with no added benefit. Moreover, a high solids latex allows increased flexibility in the paint making process because more water is available to the paint maker at higher pigment volume concentration (PVC). However, as the percent solids of the polymer increases, the viscosity increases and the polymer particles tend to agglomerate. In response to these problems, researchers have prepared dispersions with bimodal particle size, larger particle size, and broad particle size distributions. However, efforts that have achieved success in improving solids content tend to do so at the expense of hiding.

U.S. Pat. No. 6,818,697 describes a bimodal distribution of phosphoethyl methacrylate-containing acrylic polymer particles that allows the formulator to increase the solids content of the latex without sacrificing stain blocking, block resistance or shear stability. Nevertheless, maintaining hiding efficiency continues to be a challenge for high solids latexes. Accordingly, there is a need to make high solids emulsions with an even greater improvement in hiding.

SUMMARY OF THE INVENTION

The present invention addresses a need in the art by providing a composition comprising a stable aqueous dispersion of:
a) large acrylic based polymer particles having a volume average particle size in the range of from 130 nm to 250 nm; and
b) small acrylic based polymer particles having a volume average particle size in the range of from 50 nm to 100 nm;
wherein the large polymer particles comprise from 0.05 to 3 weight percent structural units of a phosphorus acid monomer or a salt thereof, based on the weight of the large particles;
wherein the small polymer particles comprise a substantial absence of structural units of any phosphorus acid monomer and salts thereof; and
wherein the weight-to-weight ratio of the large polymer particles to the small polymer particles is from 70:30 to 98:2 and the volume average particle size-to-volume average particle size ratio of the large polymer particles to the small polymer particles is at least 3:2.

The present invention provides a way to make a high solids latex with high hiding efficiency.

DETAILED DESCRIPTION OF THE INVENTION

The present invention is a composition comprising a stable aqueous dispersion of:
a) large acrylic based polymer particles having a volume average particle size in the range of from 130 nm to 250 nm; and
b) small acrylic based polymer particles having a volume average particle size in the range of from 50 nm to 100 nm;
wherein the large polymer particles comprise from 0.05 to 3 weight percent structural units of a phosphorus acid monomer or a salt thereof, based on the weight of the large particles;
wherein the small polymer particles comprise a substantial absence of structural units of any phosphorus acid monomer and salts thereof; and
wherein the weight-to-weight ratio of the large polymer particles to the small polymer particles is from 70:30 to 98:2 and the volume average particle size-to-volume average particle size ratio of the large polymer particles to the small polymer particles is at least 3:2.

As used herein, the term "acrylic based polymer particles" refers to polymer particles that comprise at least 30 weight percent based on the weight of the polymer particles structural units of methacrylate monomers such as methyl methacrylate and ethyl methacrylate and/or acrylate monomers such as ethyl acrylate, butyl acrylate, 2-propylheptyl acrylate, and 2-ethylhexyl acrylate.

As used herein, the term "structural unit" of the named monomer refers to the remnant of the monomer after polymerization. For example, a structural unit of methyl methacrylate is as illustrated:

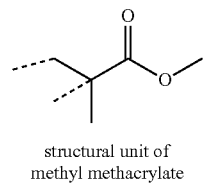

structural unit of
methyl methacrylate where the dotted lines represent the points of attachment of the structural unit to the polymer backbone.

The large acrylic based polymer particles preferably further include from 0.1 to 5 weight percent structural units of a carboxylic acid or sulfur acid monomer or a salt thereof, based on the weight of the large particles; similarly, the small acrylic based polymer particles preferably further include from 0.1 to 5 weight percent structural units of a carboxylic acid or sulfur acid monomer or a salt thereof, based on the weight of the small particles. Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, and salts thereof.

Structural units of a phosphorus acid monomer or a salt thereof are preferentially partitioned into the large polymer particles but substantially absent in the small polymer particles. As used herein, "a substantial absence of structural units of any phosphorus acid monomer and salts thereof" means that the concentration of phosphorus acid groups in the small polymer particles is sufficiently low so that a paint formulation containing the composition of the present invention will exhibit a ΔKU of <10 when subjected to heat age conditions of 60° C. for 14 days. Preferably, the concentration of phosphorus acid groups and salts thereof is less than 0.1 weight percent, more preferably less than 0.05 weight percent, and more preferably less than 0.01 weight percent, based on the weight of the small polymer particles. Most preferably, the small polymer particles comprise no phosphorus acid groups and salts thereof.

Preferably, the weight-to-weight ratio of phosphorus acid groups and salts thereof in the large particles to phosphorus acid groups and salts thereof in the small particles is at least 2:1, more preferably at least 5:1, and most preferably at least 10:1.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

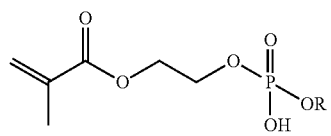

where R is H or

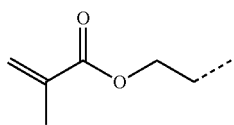

The large polymer particles preferably comprise from 0.1 to 0.3 weight percent structural units of a phosphorus acid monomer or a salt thereof, preferably PEM or a salt thereof, based on the weight of the large particles.

Preferably, the volume average particle size of the large polymer particles is in the range from 160 nm to 200 nm; preferably, the volume average particle size of the small polymer particles is in the range from 70 nm to 90 nm.

Preferably the small and large polymer particles are film-forming at room temperature and the weight-to-weight ratio of large polymer particles to small polymer particles is from 90:10 to 96:4, more preferably from 92:8 to 95:5.

The large polymer particles preferably have a core-shell morphology wherein the core comprises structural units of the phosphorus acid monomer or salt thereof. Preferably, the phosphorus acid monomer or salt thereof is partitioned preferentially in the core, which preferably protuberates from the shell in a so-called "acorn" morphology as described in U.S. Pat. No. 7,179,531.

Preferably, the core comprises from 2 to 12 weight percent structural units of the phosphorus acid monomer, based on the weight of the core, and the shell contains less than 10 weight, more preferably less than 1 weight percent structural units of the phosphorus acid monomer that is present in the core. Thus, if the core comprises 6 weight percent PEM based on the weight of the core, the shell comprises less than 0.6 weight percent, more preferably less than 0.06 weight percent, based on the weight of the core. Most preferably, the shell contains no structural units of a phosphorus acid monomer In a preferred method of preparing a preferred acorn morphology, a stable aqueous dispersion of pre-formed polymer particles is contacted with a monomer emulsion under emulsion polymerization conditions, preferably in the presence of an anionic surfactant, to form a stable aqueous dispersion of pre-formed particles protuberating from polymer particles arising from the polymerization of the monomer emulsion; preferably, the pre-formed polymer particles comprise, based on the weight of the particle particles: a) 2 to 12 weight percent structural units of a phosphorus acid monomer or a salt thereof; b) from 0.5 to 20 weight percent structural units of a carboxylic acid monomer or a sulfur acid monomer or a salt thereof or a combination thereof; c) from 0.1 to 30 weight percent structural units of a multiethylenically unsaturated monomer such as allyl methacrylate; and d) a sufficient proportion of structural units of one or more polymerizable ethylenically unsaturated bulk monomers so that the pre-formed polymer particles have a $T_g$ in the range of from −50° C., preferably from −40° C., more preferably from −20° C.; to 75° C., preferably to 30° C., and more preferably to 20° C.

The monomer emulsion preferably comprises: a) less than 10 percent by weight, more preferably less than 1 percent by weight, most preferably 0 structural units of a phosphorus acid monomer and salts thereof, based on the weight percent of structural units of the phosphorus acid monomer or a salt thereof in the pre-formed polymer; b) from 0.1 to 4 weight percent of a carboxylic acid monomer or sulfur acid monomer or a salt thereof or combination thereof, based on total monomers in the monomer emulsion; c) less than 0.5 weight percent, more preferably less that 0.1 weight percent, most preferably 0 weight percent of a multiethylenically unsaturated monomer, based on total monomers in the monomer emulsion; and d) a sufficient proportion of one or more ethylenically unsaturated bulk monomers so that the polymer particles arising from the polymerization of the monomer emulsion have a $T_g$ in the range of from −50° C., preferably from −40° C., more preferably from −20° C.; to 75° C., preferably to 30° C., and more preferably to 20° C.; and wherein the weight-to-weight ratio of the monomers in the monomer emulsion to the pre-formed polymer is preferably from 3:1, more preferably from 10:1; to preferably 40:1, more preferably to 30:1.

The stable aqueous dispersions of pre-formed polymer particles used in the process of the present invention is advantageously prepared by contacting, under emulsion polymerization conditions the phosphorus acid monomer or a salt thereof, preferably PEM or a salt thereof; the carboxylic acid monomer or sulfur acid monomer or a salt thereof or a combination thereof, preferably acrylic acid or methacrylic acid; the multiethylenically unsaturated monomer, preferably allyl methacrylate; and the one or more polymerizable ethylenically unsaturated bulk monomers at a level to produce a pre-formed polymer having a $T_g$ of from −50° C. to 75° C. As used herein, the term "ethylenically unsaturated bulk monomers" refer to monomers, other than acid monomers and multiethylenically unsaturated monomers, that are used to adjust the $T_g$ of the polymer particles. Examples of suitable polymerizable ethylenically unsaturated bulk monomers include acrylates, such as ethyl acrylate, butyl acrylate, 2-propylheptyl acrylate, and 2-ethylhexyl acrylate; methacrylates, such as methyl methacrylate, ethyl methacrylate, acetoacetoxyethyl methacrylate, and ureido methacrylate.

The acrylic based large and/or small polymer particles may also include structural of other non-acrylic monomers such as styrenes and vinyl esters including vinyl acetate and vinyl esters of neodecanoic acid.

After substantial consumption of the pre-form to make a dispersion of large acorn particles, a solution of additional anionic surfactant such as an alkoxylated sodium lauryl sulfate (commercially available as Disponil FES 993 surfactant) is advantageously added to promote the growth of small particles concomitant with the continued growth of the large acorn particles. The reaction is carried out until monomer is substantially consumed and residual unreacted monomer may be removed preferably by a redox pair such isoascorbic acid/t-butyl hydroperoxide. The pH of the bimodal dispersion is preferably adjusted to a pH in the range of about 7.5 to about 9.5 with a suitable base such as ammonium hydroxide. Particle size is determined by capillary hydrodynamic fractionation (CHDF) and solids content is also determined. The weight-to-weight percent ratios of the large to small polymer particles are advantageously measured by centrifugation.

Alternatively, a bimodal distribution of polymer particles can be achieved by blending large particles that contain phosphorus acid functionality with small particles having a substantial absence of phosphorus acid functionality.

Although it is preferred that the large polymer particles have an acorn morphology, the present invention can be practiced with other morphologies.

The composition of the present invention is useful as a binder for coatings formulations, including paint formulations. The composition can be conveniently combined with a pigment, most notably $TiO_2$, to form a composite wherein at least some of the large polymer particles are adsorbed onto the pigment.

The combination of the bimodal polymeric dispersion and pigment is useful in the preparation of paint formulations, which may include a variety of components such as solvents; coalescents; fillers; rheology modifiers; hollow pigments, including pigments having one or more voids; dispersants, such as aminoalcohols and polycarboxylates; extenders; surfactants; defoamers; preservatives, such as biocides, mildewcides, fungicides, algaecides, and combinations thereof; flow agents; leveling agents; and neutralizing agents, such as hydroxides, amines, ammonia, and carbonates.

It has surprisingly been discovered that dispersions with a solids content of preferably at least 50%, more preferably at least 54%, and most preferably at least 58% can be prepared while maintaining efficient hiding with acceptable KU viscosity drift.

EXAMPLES

The following examples are for illustrative purposes only and are not intended to limit the scope of the invention.

Example 1

Bimodal Aqueous Emulsion Copolymer with Acorn Morphology

A. Pre-form Intermediate

A first monomer emulsion was prepared by mixing (DI water) 200 g, Disponil FES 993 anionic surfactant (64 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-liter, four-necked round-bottom flask equipped with a paddle stirrer, a thermometer, $N_2$ inlet, and a reflux condenser was added DI water (600 g) and Disponil FES 993 anionic surfactant (21.3 g, 30% active). The contents of the flask were heated to 85° C. under a $N_2$ atmosphere, and stirring was initiated. A portion of the first monomer emulsion (70 g) was then added, quickly followed by addition of an aqueous solution of sodium persulfate (2.56 g in 30 g DI water) and a further rinse with deionized water (5 g). After stirring for 10 min, the remainder of the first monomer emulsion, followed by a DI rinse (25 g), and an aqueous initiator solution of sodium persulfate (0.64 g dissolved in 50 g DI water) were added linearly and separately over 40 min. After completion of addition of the monomer emulsion feed, the contents of the flask were held at 85° C. for 10 min. After 10 min the co-feed was finished, and the contents of the flask were held at 85° C. for an additional 10 min. The contents of the flask were cooled to room temperature. The measured particle size was 60-75 nm and the solids were 40-41%.

Part B.

Deionized water (698 g) was added to a 5-L, four-necked round-bottom flask equipped with a paddle stirrer, a thermometer, nitrogen inlet, and a reflux condenser. The contents of the flask were heated to 85° C. under a $N_2$ atmosphere, and stirring was initiated. A 22% aqueous solution of ammonium persulfate (5.7 g) was added to the reactor followed by a rinse of DI water (5.7 g) followed by addition of the Part A intermediate (300 g).

A monomer emulsion was prepared by mixing DI water (388 g), a 30% aqueous solution of ammonium hydroxide (1.23 g), Disponil FES 993 surfactant (47.3 g, 30% active), butyl acrylate (498.8 g), methacrylic acid (23.6 g), 2-ethylhexyl acrylate (638.2 g), and ureido methacrylate (61.5 g, 50% active). The monomer emulsion was added over 120 min while the reactor temperature was held constant at 85° C. After 20 min, the monomer emulsion feed rate was doubled, and the remainder of the monomer emulsion was added linearly. After 38 min of monomer emulsion addition, a 27% solution of Disponil FES 993 surfactant (65° C., 166.8 g, 30% active) and aqueous NaOH (5.14 g, 50%) was quickly added followed by a DI water (20 g) rinse while maintaining the temperature at 85° C.

When half the monomer emulsion was added to the kettle, a 9% ammonium persulfate solution (2.4 g) was linearly added followed by a deionized water (5 g) rinse. When all additions were complete, the monomer emulsion container was rinsed with DI water (20 g), which was then added to the reactor. An additional 50 g DI water was added to the reactor. The contents of the reactor were cooled to 70° C. and solutions of t-butyl hydroperoxide (2.75 g, 70%) in deionized water (10 g) and isoascorbic acid (3.50 g) in deionized water (10 g) were added to the flask over 15 min to reduce residual monomer as the reactor continued to cool. The polymer was then neutralized to pH 8 with an ammonium hydroxide (11.0 g, 30%) solution. A dilute solution of KORDEK™ LX5000 Biocide (A Trademark of The Dow Chemical Company or its Affiliates, 17.2 g, 5%) and Tego Foamex 1488 defoamer (4.34 g, 24%) were then added. The measured solids content was 58.7%. Centrifugation of the dispersion showed two distinctive modes of polymer 1 (10.7% at 82 nm, and 89.3% at 185 nm). Particle size was determined by CHDF.

Comparative Example 1

Unimodal Aqueous Emulsion Copolymer

A first monomer emulsion was prepared by mixing deionized water (90 g), Disponil FES 993 surfactant (40.9 g, 30% active), 2-ethylhexyl acrylate (145.8 g), butyl acrylate (118.8 g), methyl methacrylate (229.7 g), phosphoethyl methacrylate (41.4 g, 60% active), and methacrylic acid (4.3 g). A second monomer emulsion was prepared by mixing deionized water (290 g), Disponil FES 993 surfactant (39.8 g, 30% active), 2-ethylhexyl acrylate (340.2 g), butyl acrylate (261.0 g), methyl methacrylate (610.1 g), ureido methacrylate (44.9 g, 50% active), and methacrylic acid (10.1 g).

Deionized water (785.6 g) and Disponil FES 32 surfactant (1.2 g, 30% active) were added to a 5-L, four-necked round-bottom flask equipped with a paddle stirrer, a thermometer, nitrogen inlet, and a reflux condenser. The contents of the flask were heated to 85° C. under a $N_2$ atmosphere, and stirring was initiated. A solution of sodium persulfate (7.2 g) dissolved in deionized water (15.0 g), followed by a rinse of deionized water (6 g) was added to the reactor quickly, followed by an acrylic emulsion pre-form (163 g, 60 nm, 41% solids).

The first monomer emulsion was added linearly to the flask over 30 min followed by a deionized water rinse (20 g). Subsequently, the second monomer emulsion and a solution of sodium persulfate (2 g) and aqueous ammonia (25.8 g, 30%) dissolved in deionized water (50.0 g) were separately added over 75 min. The second monomer emulsion vessel was rinsed to the reactor with deionized water (20 g), and the reaction was held at 85° C. for 10 min.

The contents of the flask were cooled to 65° C. and solutions of t-butyl hydroperoxide (2.75 g, 70%) in deionized water (10 g) and isoascorbic acid (3.50 g) in deionized water (10 g) were added to the flask over 15 min to reduce residual monomer as the reactor continued to cool. The polymer was then neutralized to pH 8.0 with an ammonium hydroxide solution (5 g, 30%). A dilute solution of KORDEK™ LX5000 Biocide (A Trademark of The Dow Chemical Company or its Affiliates, 13.80 g, 5%) was then added. The particle size of polymer 2 was 187 nm and the solids 53.9%.

Comparative Example 2

Bimodal Aqueous Emulsion Copolymer with PEM in Both Modes

This example was carried out as described in Example 4 of U.S. Pat. No. 6,818,697. A monomer emulsion was prepared by mixing deionized water (680 g), Disponil Fes 993 surfactant (64.5 g, 30%), butyl acrylate (940 g), methyl methacrylate (976 g), 1-dodecanethiol (5 g), phosphoethyl methacrylate (64 g, 60% active), and ureido methacrylate (40 g, 50% aqueous solution).

Deionized water (700 g) was added to a 5-L, four-necked round-bottom flask equipped with a paddle stirrer, a thermometer, nitrogen inlet, and a reflux condenser. The contents of the flask were heated to 80° C. under a $N_2$ atmosphere, and stirring was initiated. Ammonium bicarbonate (6.6 g), Disponil Fes 993 surfactant (29.0 g, 30% aqueous solution), and an acrylic polymer emulsion pre-form (88.9 g, 100 nm, 45% solids) were added to the reactor.

With the reactor at 80° C., a solution of 0.1% iron sulfate (25 g) and 1% Versene (1.7 g) was added to the reactor followed by a solution of t-butyl hydroperoxide (0.5 g, 70%) diluted in deionized water (10 g). A solution of isoascorbic acid (0.25 g) dissolved in deionized water (10 g) was also added. After each addition, deionized water (5 g) was used to rinse the addition co-feed solutions of t-butyl hydroperoxide (3.9 g, 70%) in deionized water (99 g) and isoascorbic acid (2.6 g) in deionized water (99 g) were linearly added with the monomer emulsion. After half the monomer emulsion was added, ammonium hydroxide (10.9 g, 30%) was added to the isoascorbic acid co-feed solution. After the completion of the monomer emulsion addition, the monomer emulsion flask was rinsed with deionized water (30 g). While the reactor was cooling to 60° C., a solution of t-butyl hydroperoxide (0.27 g, 70%) in deionized water (10 g) and a solution of isoascorbic acid (0.17 g) in deionized water (10 g) were added to the reactor. Subsequently, a second addition of a solution of t-butyl hydroperoxide (0.82 g, 70%) in deionized water (10 g) and a solution of isoascorbic acid (0.54 g) in deionized water (15 g) were gradually added over 15 min. A solution of ammonium hydroxide (18.8 g, 30%) was used to adjust the pH of the dispersion to 8.2. The particle size of the emulsion polymer was measured by CHDF to be a bimodal distribution with 58% at 102 nm and 42% at 215 nm. The solids content was found to be 52.4%.

Preparation of Paint Formulation

Foamstar A-34 defoamer (1.08 g) and water (121.86 g) were added to a portion of each of the polymer dispersions (190.1 g) in a paint can. The contents were mixed well using a bench-top mixer at a mixing speed of 350-450 rpm, followed by addition of Kronos 4311 slurried $TiO_2$ (238.68 g). This dispersion was mixed for approximately 10 min to form a composite.

Water (121.86 g), propylene glycol (3.0 g), Dispersant (TAMOL™ 165A Dispersant, a Trademark of The Dow Chemical Company or its Affiliates, 4.37 g, 21.5% aqueous), Coalescent (Texanol ester alcohol coalescent (10.62 g)) and Surfactant (TRITON™ GR-7M Surfactant, a Trademark of The Dow Chemical Company or its Affiliates, 2.20 g, 64% aqueous) were sequentially added with mixing, followed by addition of Letdown Binder (RHOPLEX™ VSR-50 Binder, a Trademark of The Dow Chemical Company or its Affiliates, 308.86, 45.5%). Mixing speed was adjusted throughout the process to maintain a vortex. The following ingredients were then added sequentially with mixing: Opaque Polymer (ROPAQUE™ ULTRA Opaque Polymer, a Trademark of The Dow Chemical Company or its Affiliates, 47.34 g, 30% aqueous); Defoamer (Tego Foamex 8030 defoamer, 2.00 g, 25% aqueous); ammonia (2.00 g, 30% aqueous); Rheology Modifier 1 (ACRYSOL™ RM-2020NPR Rheology Modifier, a Trademark of The Dow Chemical Company or its Affiliates, 27.40 g, 20% aqueous), Rheology Modifier 2 (ACRYSOL™ RM 8W Rheology Modifier, a Trademark of The Dow Chemical Company or its Affiliates, 2.70 g, 21.5% aqueous), and water (20.91 g). After the final ingredient was added, the paint stirred for 5 min. The ingredients, proportions, and order of addition are listed in Table 1. The paint equilibrated overnight, after which time hiding and viscosity were measured.

TABLE 1

| Sample Formulation | |
|---|---|
| Material Name | Weight (g) |
| Emulsion Polymer 1-6 | 190.12 |
| Defoamer | 1.08 |
| Water | 121.86 |
| TiO$_2$ | 238.68 |
| Water | 20.00 |
| Propylene Glycol | 3.00 |
| Dispersant | 4.37 |
| Coalescent | 10.62 |
| Surfactant | 2.20 |
| Grind Sub-Total | 601.93 |
| Let-down Binder | 308.86 |
| Opaque Polymer | 47.34 |
| Defoamer | 2.00 |
| Ammonia | 2.00 |
| Rheology Modifier 1 | 27.40 |

TABLE 1-continued

Sample Formulation

| Material Name | Weight (g) |
|---|---|
| Rheology Modifier 2 | 2.70 |
| Water | 20.91 |
| Total | 1013.14 |

Kubelka-Munk S/mil Test Method

S/mil was determined for each of the final paint formulations as follows: Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The y-reflectance was measured using a BYK Gardner 45° Reflectomer in each of the scribed areas five times measuring on a diagonal starting at the top of the rectangle and the average y-reflectance recorded. A thick film draw down was prepared for each paint on Black Vinyl Charts (Leneta Form P121-10N) using a 3"×25 mil block draw down bar and the charts were allowed to dry overnight. The y-reflectance was measured in five different areas of the draw down and the average y-reflectance recorded. Kubelka-Munk hiding value S is given by Equation 1:

$$S = \frac{R}{X \times (1 - R^2)} \times \ln\frac{1 - (R_B \times R)}{1 - \frac{R_B}{R}}$$

Equation 1 where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X(\text{mils}) = \frac{W_{pf}(g) \times 1000 \,(\text{mil/in})}{D(\text{lbs/gal}) \times 1.964 \,(g/\text{in}^3 / \text{lbs/gal}) \times A(\text{in})}$$

Viscosity Rise (ΔKU) Measurements: ASTM Test Method D 562-81 was used to measure a change in viscosity rise at room temperature 1 day and 7 days after formulating relative to the equilibrated viscosity.

The sample paints contain 10 weight % less TiO₂ than the control paint VSR-50 (RHOPLEX™ VSR-50 Letdown Binder); hiding is recorded as a percentage of VSR-50, as illustrated in Table 2. The solids content for the VSR-50 letdown binder is 45.5%.

TABLE 2

Properties of the Paint Formulations

| Sample | % Solids | ΔKU 1 day | ΔKU 7 day | % S/mil of VSR-50 | Film Appearance |
|---|---|---|---|---|---|
| Example 1 | 58.0% | 6 | 10 | 101.31% | good |
| Comparative Example 1 | 53.9% | 16 | 37 | 91.83% | good |
| Comparative Example 2 | 52.4% | 15 | 16 | 90.38% | gritty |

As Table 2 shows, the formulation prepared using the binder of Example 1 achieves several advantages over the formulations using the binders of the comparative examples, namely higher solids, improved KU stability, and more efficient hiding. Moreover, the film appearance for the formulation of Example 1 is comparable to that of Comparative Example 1 and superior to that of Comparative Example 2, where PEM was incorporated in both the large and small particles.

The solids content achieved for the example of the present invention is substantially higher than the solids content for VSR-50, as is hiding, especially when considering that the example of the present invention has 10% less TiO₂ than the control.

The invention claimed is:

1. A composition comprising a stable aqueous dispersion of
    a) large acrylic based polymer particles having a volume average particle size in the range of from 130 nm to 250 nm; and
    b) small acrylic based polymer particles having a volume average particle size in the range of from 50 nm to 100 nm;
    wherein the large polymer particles comprise from 0.05 to 3 weight percent structural units of a phosphorus acid monomer or a salt thereof, based on the weight of the large particles;
    wherein the small polymer particles have a concentration of phosphorus acid groups and salts thereof of less than 0.05 weight percent, based on the weight of the small polymer particles; and
    wherein the weight-to-weight ratio of the large polymer particles to the small polymer particles is from 70:30 to 98:2 and the volume average particle size-to-volume average particle size ratio of the large polymer particles to the small polymer particles is at least 3:2.

2. The composition of claim 1 wherein the large and small polymer particles each comprise structural units of a) methyl methacrylate and b) ethyl acrylate, butyl acrylate, 2-propylheptyl acrylate, or 2-ethylhexyl acrylate or a combination thereof; wherein the $T_g$ for the large and the small particles is in the range of −40 ° C. to 75 ° C.; wherein the large polymer particles further include from 0.1 to 5 weight percent structural units of a carboxylic acid or sulfur acid monomer or a salt thereof, based on the weight of the large polymer particles; and wherein the small polymer particles further include from 0.1 to 5 weight percent structural units of a carboxylic acid or sulfur acid monomer or a salt thereof, based on the weight of the small polymer particles.

3. The composition of claim 2 wherein the large polymer particles are characterized by a core-shell morphology; wherein the core protuberates from the shell and the core comprises from 2 to 12 weight percent structural units of the phosphorus acid monomer, based on the weight of the core, and the shell contains less than 10 weight percent structural units of the phosphorus acid monomer that is present in the core; wherein the solids content of the stable aqueous dispersion is at least 54%.

4. The composition of claim 1 wherein the weight percent of the structural units of the phosphorus acid monomer in the large polymer particles with the core-shell morphology is from 0.1 to 0.3 weight percent, based on the weight of the large polymer particles; the
phosphorus acid monomer is phosphoethyl methacrylate or a salt thereof; the shell contains less than 1 weight percent structural units of the phosphoethyl methacrylate or a salt thereof that is present in the core; the large polymer particles have a volume average particle size in the range of from 160 nm to 200 nm; and the small polymer particles have a volume average particle size in the range of from 70 nm to 90 nm; and wherein the $T_g$s of the large and small particles are in the range of from −20 °C to 20 °C.

5. The composition of claim 4 wherein the small and large polymer particles are film-forming at room temperature and the weight-to-weight ratio of large polymer particles to small polymer particles is from 90:10 to 96:4.

6. The composition of claim 5 wherein the stable aqueous dispersion has a solids content of at least 58 weight percent, wherein the weight-to-weight ratio of large polymer particles to small polymer particles is from 92:8 to 95:5.

7. The composition of claim 6 which further comprises pigment particles wherein at least some of the large polymer particles are adsorbed onto the pigment particles.

8. A coatings formulation comprising the composition of claim 1 and one or more components selected from the group consisting of a rheology modifier, a pigment, a defoamer, a surfactant, a dispersant, an extender, a solvent, a preservative, and a coalescent.

9. A composition comprising a stable aqueous dispersion of
a) large acrylic based polymer particles having a volume average particle size in the range of from 130 nm to 250 nm; and
b) small acrylic based polymer particles having a volume average particle size in the range of from 50 nm to 100 nm;
wherein the large polymer particles comprise from 0.05 to 3 weight percent structural units of a phosphorus acid monomer or a salt thereof, based on the weight of the large particles;
wherein the small polymer particles have a concentration of phosphorus acid groups and salts thereof less than 0.1 weight percent based on the weight of the small polymer particles;
wherein the weight-to-weight ratio of large polymer particles to small polymer particles is from 92:8 to 95:5 and the volume average particle size-to-volume average particle size ratio of the large polymer particles to the small polymer particles is at least 3:2; and
wherein the stable aqueous dispersion has a solids content of at least 58 weight percent.

10. The composition of claim 9 which further comprises pigment particles wherein at least some of the large polymer particles are adsorbed onto the pigment particles.

11. The composition of claim 3 wherein the weight percent of the structural units of the phosphorus acid monomer in the large polymer particles with the core-shell morphology is from 0.1 to 0.3 weight percent, based on the weight of the large polymer particles; the phosphorus acid monomer is phosphoethyl methacrylate or a salt thereof; the shell contains less than 1 weight percent structural units of the phosphoethyl methacrylate or a salt thereof that is present in the core; the large polymer particles have a volume average particle size in the range of from 160 nm to 200 nm; and the small polymer particles have a volume average particle size in the range of from 70 nm to 90 nm.

12. The composition of claim 11 wherein the small polymer particles have a concentration of phosphorus acid groups and salts thereof of less than 0.01 weight percent, based on the weight of the small polymer particles.

13. The composition of claim 3 wherein the large and small polymer particles each comprise structural units of a) methyl methacrylate and b) ethyl acrylate, butyl acrylate, 2-propylheptyl acrylate, or 2-ethylhexyl acrylate or a combination thereof; wherein the large polymer particles further include from 0.1 to 5 weight percent structural units of a carboxylic acid or sulfur acid monomer or a salt thereof, based on the weight of the large polymer particles; and wherein the small polymer particles further include from 0.1 to 5 weight percent structural units of a carboxylic acid or sulfur acid monomer or a salt thereof, based on the weight of the small polymer particles.

* * * * *